United States Patent
Takeuchi

(10) Patent No.: US 10,065,328 B2
(45) Date of Patent: Sep. 4, 2018

(54) SUCTION DEVICE

(71) Applicant: Murata Manufacturing Co., Ltd., Kyoto (JP)

(72) Inventor: Susumu Takeuchi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/825,244

(22) Filed: Nov. 29, 2017

(65) Prior Publication Data

US 2018/0079088 A1 Mar. 22, 2018

Related U.S. Application Data

(63) Continuation of application No. PCT/JP2016/063950, filed on May 11, 2016.

(30) Foreign Application Priority Data

May 29, 2015 (JP) .................... 2015-109269

(51) Int. Cl.
 *B25J 15/06* (2006.01)
 *F16K 31/126* (2006.01)
 (Continued)

(52) U.S. Cl.
 CPC ......... *B25J 15/0633* (2013.01); *B25B 11/007* (2013.01); *B25J 15/0061* (2013.01);
 (Continued)

(58) Field of Classification Search
 CPC .. B25J 15/0633; B25J 15/0061; B25B 11/007
 (Continued)

(56) References Cited

U.S. PATENT DOCUMENTS 2,934,086 A * 4/1960 Blatt ................ F04F 5/20
 137/560
5,207,553 A * 5/1993 Konagai ............ B25J 15/0616
 294/65

(Continued)

FOREIGN PATENT DOCUMENTS

JP H03-73289 A 3/1991
JP H08-118280 A 5/1996
(Continued)

OTHER PUBLICATIONS

Written Opinion for PCT/JP2016/063950 dated Aug. 9, 2016.
International Search Report for PCT/JP2016/063950 dated Aug. 9, 2016.

*Primary Examiner* — Paul T Chin
(74) *Attorney, Agent, or Firm* — Pearne & Gordon LLP

(57) ABSTRACT

A suction device includes a valve, a piezoelectric pump, and a housing. The valve includes a valve casing and a diaphragm. A first ventilation hole, a second ventilation hole, and a third ventilation hole are formed in the valve casing. The diaphragm is fixed to the valve casing and forms a flow path in the valve casing. The second ventilation hole is opened under atmospheric pressure. The piezoelectric pump has a suction hole and a discharge hole. The discharge hole is in communication with the first ventilation hole. The housing has a cavity. A suction pad is attached to the cavity. The housing forms an enclosed space together with the valve and the piezoelectric pump. The enclosed space is a space that is in communication with the cavity, the suction hole, and the third ventilation hole.

15 Claims, 11 Drawing Sheets

(51) Int. Cl.
  *B25J 15/00* (2006.01)
  *B25B 11/00* (2006.01)
  *B65G 47/91* (2006.01)
  *B65G 59/04* (2006.01)

(52) U.S. Cl.
  CPC .......... *F16K 31/126* (2013.01); *B65G 47/911* (2013.01); *B65G 59/04* (2013.01)

(58) Field of Classification Search
  USPC .......... 294/65, 183, 185, 186, 189; 414/737
  See application file for complete search history.

(56) References Cited

U.S. PATENT DOCUMENTS

| | | | | |
|---|---|---|---|---|
| 5,609,377 | A * | 3/1997 | Tanaka | B65G 47/918 294/65 |
| 6,437,560 | B1 * | 8/2002 | Kalb | B25B 11/007 248/363 |
| 6,979,032 | B2 * | 12/2005 | Damhuis | B25J 15/0052 294/185 |
| 2006/0131905 | A1 * | 6/2006 | Mazzucchelli | B65G 47/91 294/188 |
| 2007/0006940 | A1 * | 1/2007 | Perlman | B25B 11/007 141/65 |
| 2013/0106126 | A1 * | 5/2013 | Lomerson, Jr. | B25J 15/0633 294/188 |
| 2013/0178752 | A1 | 7/2013 | Kodama | |
| 2015/0328779 | A1 * | 11/2015 | Bowman | B65H 3/0883 294/188 |
| 2016/0136821 | A1 * | 5/2016 | Vaughn | B25J 15/0625 294/183 |
| 2017/0043065 | A1 * | 2/2017 | Takeuchi | A61M 1/00 |

FOREIGN PATENT DOCUMENTS

| | | |
|---|---|---|
| JP | 2001-354323 A | 12/2001 |
| JP | 2002-326178 A | 11/2002 |
| JP | 5185475 B2 | 4/2013 |

\* cited by examiner

SUCTION DEVICE

This application is a continuation of International Application No. PCT/JP2016/063950 filed on May 11, 2016 which claims priority from Japanese Patent Application No. 2015-109269 filed on May 29, 2015. The contents of these applications are incorporated herein by reference in their entireties.

BACKGROUND OF THE DISCLOSURE

Field of the Disclosure

The present disclosure relates to a suction device that draws in a gas.

Description of the Related Art

In the related art, various suction devices that draw in gases have been designed. For example, Patent Document 1 discloses a pair of vacuum tweezers that sucks in an object (workpiece), such as an electronic component, by using a suction member and moves and places the object at a different location. The vacuum tweezers includes the suction member, a suction pump, and a solenoid valve. The suction member has a hole. The suction pump draws in air through the hole of the suction member. The solenoid valve switches the communication state between the hole of the suction member and the outside air by opening and closing its valve.

In the above-described configuration, during the period when the suction pump and the solenoid valve are in an ON state, the communication between the hole of the suction member and the outside air is interrupted. Thus, during this period of time, a user can perform an operation for causing an object to be sucked to the hole of the suction member. On the other hand, during the period when the solenoid valve is in an OFF state, the hole of the suction member and the outside air communicate with each other. Thus, the user can move the object, which has been sucked to the hole of the suction member, and then separate the object from the suction member at a target location by bringing the solenoid valve into the OFF state.

In the manner described above, the vacuum tweezers is capable of performing suction and separation of an object as a result of the solenoid valve actively opening and closing its valve.

Patent Document 1: Japanese Unexamined Patent Application Publication No. 8-119280

BRIEF SUMMARY OF THE DISCLOSURE

However, the vacuum tweezers disclosed in Patent Document 1 needs to include the solenoid valve in order to be capable of performing the suction and separation of an object. In addition, the vacuum tweezers needs to include a driving circuit for driving the solenoid valve.

Consequently, there is a problem in that increases in the weight and size of the vacuum tweezers due to the solenoid valve cannot be avoided. In addition, there is another problem in that the vacuum tweezers generates large noise due to the operating sound of the solenoid valve.

It is an object of the present disclosure to provide a suction device in which reductions in the weight and size of the suction device and a reduction in the noise generated by the suction device are achieved.

A suction device according to the present disclosure has the following configuration in order to solve the above-mentioned problems.

The suction device according to the present disclosure includes a valve that includes a valve casing in which a first ventilation hole, a second ventilation hole, and a third ventilation hole are formed and a diaphragm that is fixed to the valve casing so as to form a flow path in the valve casing, a pump that has a suction hole and a discharge hole that is in communication with the first ventilation hole, and a housing that has a cavity and forms, together with the valve and the pump, an enclosed space that is in communication with the cavity, the suction hole, and the third ventilation hole.

The diaphragm switches, based on a pressure at the first ventilation hole and a pressure at the second ventilation hole, the flow path between a first form in which the first ventilation hole and the second ventilation hole communicate with each other while the second ventilation hole and the third ventilation hole do not communicate with each other and a second form in which the first ventilation hole and the second ventilation hole do not communicate with each other while the second ventilation hole and the third ventilation hole communicate with each other.

In this configuration, for example, the second ventilation hole is opened under atmospheric pressure. In this configuration, during the period when the pump is in an ON state, the pump draws in a gas in the enclosed space through the suction hole and discharges the gas to the first ventilation hole through the discharge hole. As a result, the pressure at the first ventilation hole increases. For example, the diaphragm switches the flow path to the first form by using an increase in the pressure at the first ventilation hole. In the first form, the gas in the enclosed space is drawn in by the pump and flows from the first ventilation hole to the second ventilation hole. As a result, during the period when the pump is in the ON state, the pressure in the enclosed space becomes a negative pressure, and the suction device can suck in an object, such as an electronic component, through the cavity. A user can also move the object sucked to the cavity.

In contrast, when the pump is brought into an OFF state, the pressure at the first ventilation hole stops increasing. For example, the diaphragm switches the flow path to the second form by utilizing the fact that the pressure at the first ventilation hole has stopped increasing. In the second form, the gas flows through the second ventilation hole into the enclosed space via the second ventilation hole and the third ventilation hole. As a result, during the period when the pump is in the OFF state, the pressure in the enclosed space becomes equal to atmospheric pressure, and the suction device can separate the object, such as an electronic component, from the cavity.

In the manner described above, the diaphragm automatically switches the flow path by using the pressure at the first ventilation hole and the pressure at the second ventilation hole. In other words, the valve, which has the above-described configuration, passively opens and closes the valve in accordance with the operation of the pump. Thus, the suction device, which has the above-described configuration, can cause an object, such as an electronic component, to be sucked thereto and separated therefrom without including a solenoid valve.

Therefore, the suction device, which has the above-described configuration, can be further reduced in weight and size than that of the related art, and the noise generated by the suction device can be further reduced than that of the related art.

In the present disclosure, it is preferable that the diaphragm form, in the valve casing, a first region that is in communication with the first ventilation hole and a second region that is in communication with the second ventilation hole, and it is preferable that the diaphragm switch the flow path to the first form when a pressure in the first region is higher than a pressure in the second region and switch the flow path to the second form when the pressure in the first region is lower than the pressure in the second region.

In this configuration, the diaphragm switches the flow path to the first form by utilizing the fact that the pressure in the first region is higher than the pressure in the second region. On the other hand, the diaphragm switches the flow path to the second form by utilizing the fact that the pressure in the first region is lower than the pressure in the second region.

In the present disclosure, it is preferable that the valve casing include a first valve seat that projects toward the diaphragm in the first region and a second valve seat that projects from a periphery of the third ventilation hole toward the diaphragm in the second region, and it is preferable that the diaphragm have a fourth ventilation hole and that the diaphragm be fixed to the valve casing in a state where a portion of the diaphragm around a periphery of the fourth ventilation hole is in contact with the first valve seat and where another portion of the diaphragm is in contact with the second valve seat.

In this configuration, the portion of the diaphragm around the periphery of the fourth ventilation hole moves into and out of contact with the first valve seat on the basis of the pressure at the first ventilation hole and the pressure at the second ventilation hole. As a result, the first ventilation hole and the second ventilation hole communicate with each other or the communication between the first ventilation hole and the second ventilation hole is interrupted.

In this configuration, another portion of the diaphragm moves into and out of contact with the second valve seat on the basis of the pressure at the first ventilation hole and the pressure at the second ventilation hole. As a result, the second ventilation hole and the third ventilation hole communicate with each other or the communication between the second ventilation hole and the third ventilation hole is interrupted.

In the present disclosure, it is preferable that a suction pad be attached to the cavity.

In this configuration, the suction device can easily suck in an object.

In the present disclosure, it is preferable that the pump have a structure in which the suction hole and the discharge hole are in constant communication with each other.

In this configuration, immediately after the pump has been brought into the OFF state, the pressure at the first ventilation hole is higher than the pressure in the enclosed space, and thus, the gas flows backward from the discharge hole toward the suction hole. Therefore, in this configuration, immediately after the pump has been brought into the OFF state, the pressure at the first ventilation hole rapidly decreases.

In the present disclosure, it is preferable that the pump include a piezoelectric body and perform a pumping operation by expansion and contraction of the piezoelectric body.

The pump having this configuration uses, as a driving source, a piezoelectric body that generates small sound and small vibration during the period when the piezoelectric body is driven. Thus, the noise generated by the suction device according to the present disclosure can be further reduced.

According to the present disclosure, a suction device can be provided in which reductions in the weight and size of the suction device and a reduction in the noise generated by the suction device are achieved.

DETAILED DESCRIPTION OF THE DISCLOSURE

A suction device 100 according to a first embodiment of the present disclosure will be described below.

Figure 1:
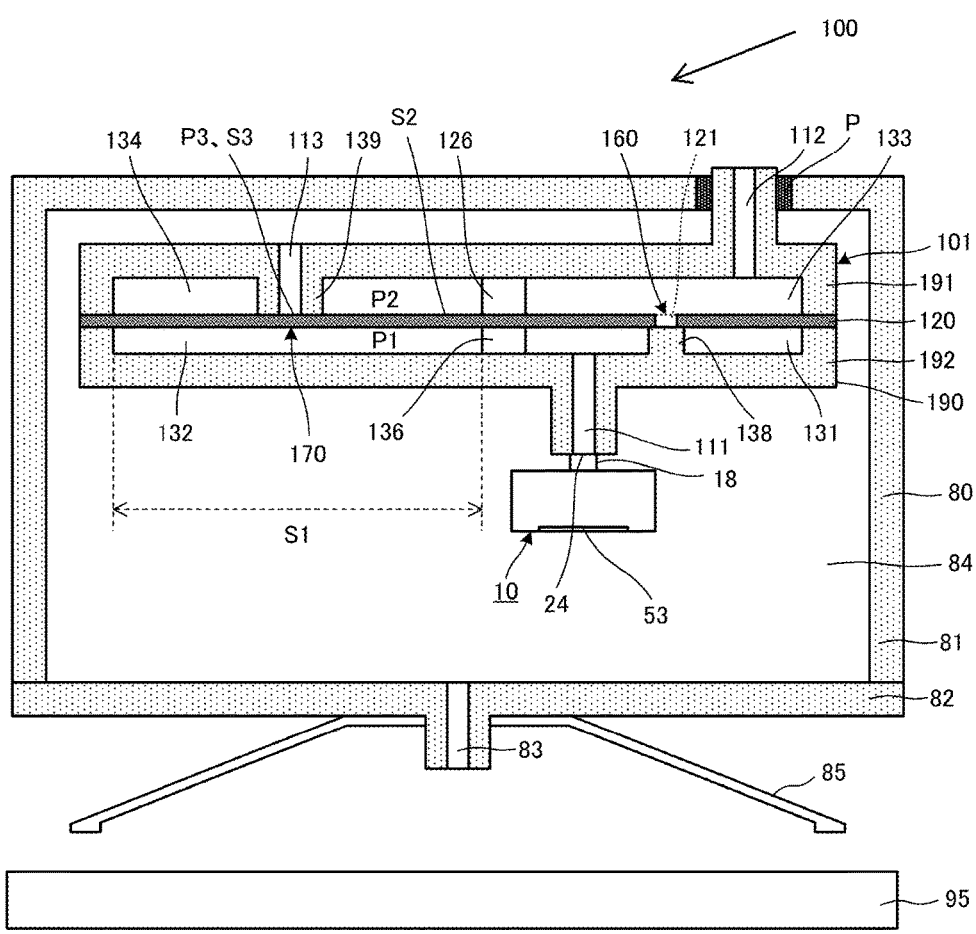
FIG. 1 is a sectional view of a principal portion of a suction device 100 according to a first embodiment of the present disclosure.

FIG. 1 is a sectional view of a principal portion of the suction device 100 according to the first embodiment of the present disclosure. The suction device 100 includes a valve 101, a piezoelectric pump 10, and a housing 80. The suction device 100 is an example of a so-called pick-and-place device. Specifically, a user can cause, for example, an object (workpiece) 95, such as an electronic component, to be sucked to a suction pad 85 of the suction device 100 and separate the object 95 from the suction pad 85 at a different location after moving the suction device 100.

The valve 101 includes a valve casing 190 and a diaphragm 120 (described in detail below). A first ventilation hole 111, a second ventilation hole 112, and a third ventilation hole 113 are formed in the valve casing 190. The valve casing 190 includes an upper valve housing 191 and a lower valve housing 192. The diaphragm 120 is fixed to the upper valve housing 191 and the lower valve housing 192 so as to form a flow path in the valve casing 190. The second ventilation hole 112 of the valve 101 is opened under atmospheric pressure.

The piezoelectric pump 10 has a suction hole 53, a discharge hole 24, and a nozzle 18 (described in detail later). The nozzle 18 of the piezoelectric pump 10 is bonded to the lower valve housing 192 of the valve 101 with, for example, an adhesive. This allows the communication between the discharge hole 24 of the piezoelectric pump 10 and the first ventilation hole 111 of the valve 101.

Note that the piezoelectric pump 10 corresponds to an example of a pump according to the present disclosure.

The housing 80 includes an upper housing 81 and a lower housing 82. The material of the housing 80 is, for example, a resin. The valve 101 is mounted on the upper housing 81 with a packing member P interposed therebetween such that the air outside the housing 80 will not flow into the housing 80. The upper housing 81 and the lower housing 82 are bonded together with, for example, an adhesive in a state where the valve 101 and the piezoelectric pump 10 are accommodated therein. The lower housing 82 has a cavity 83. The suction pad 85 is attached to the cavity 83. The housing 80 forms an enclosed space 84 together with the valve 101 and the piezoelectric pump 10. The enclosed space 84 is a space that is in communication with the cavity 83, the suction hole 53, and the third ventilation hole 113.

Note that, in the present embodiment, although the valve 101 is mounted on the upper housing 81 with the packing member P interposed therebetween, the present disclosure is not limited to this configuration. In practice, an adhesive or the like may be used instead of the packing member P. For example, the valve 101 may be bonded to the upper housing 81 with an adhesive.

In the valve 101, the diaphragm 120 switches the flow path between a first form and a second form on the basis of the pressure at the first ventilation hole 111 and the pressure at the second ventilation hole 112. In the first form, the first ventilation hole 111 and the second ventilation hole 112 communicate with each other, and the second ventilation hole 112 and the third ventilation hole 113 do not communicate with each other. In the second form, the first ventilation hole 111 and the second ventilation hole 112 do not communicate with each other, and the second ventilation hole 112 and the third ventilation hole 113 communicate with each other.

The structures of the piezoelectric pump 10 and the valve 101 will now be described in detail. First, the structure of the piezoelectric pump 10 will be described in detail with reference to FIG. 2, FIG. 3, and FIG. 4.

Figure 2:
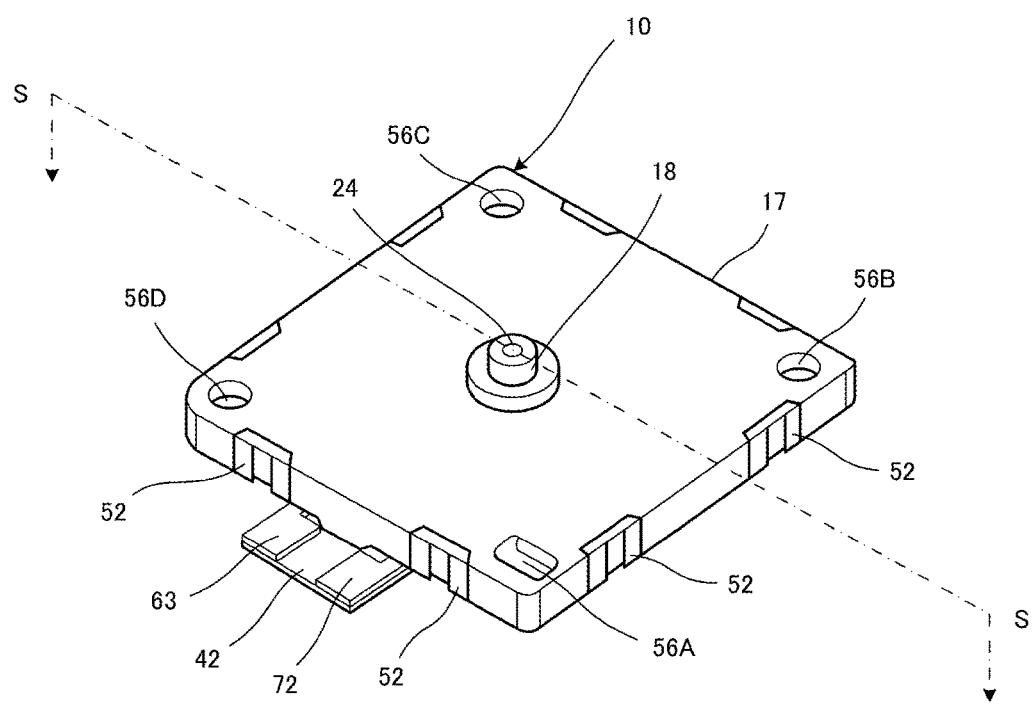
FIG. 2 is an external perspective view of a piezoelectric pump 10 illustrated in FIG. 1.
Figure 3:
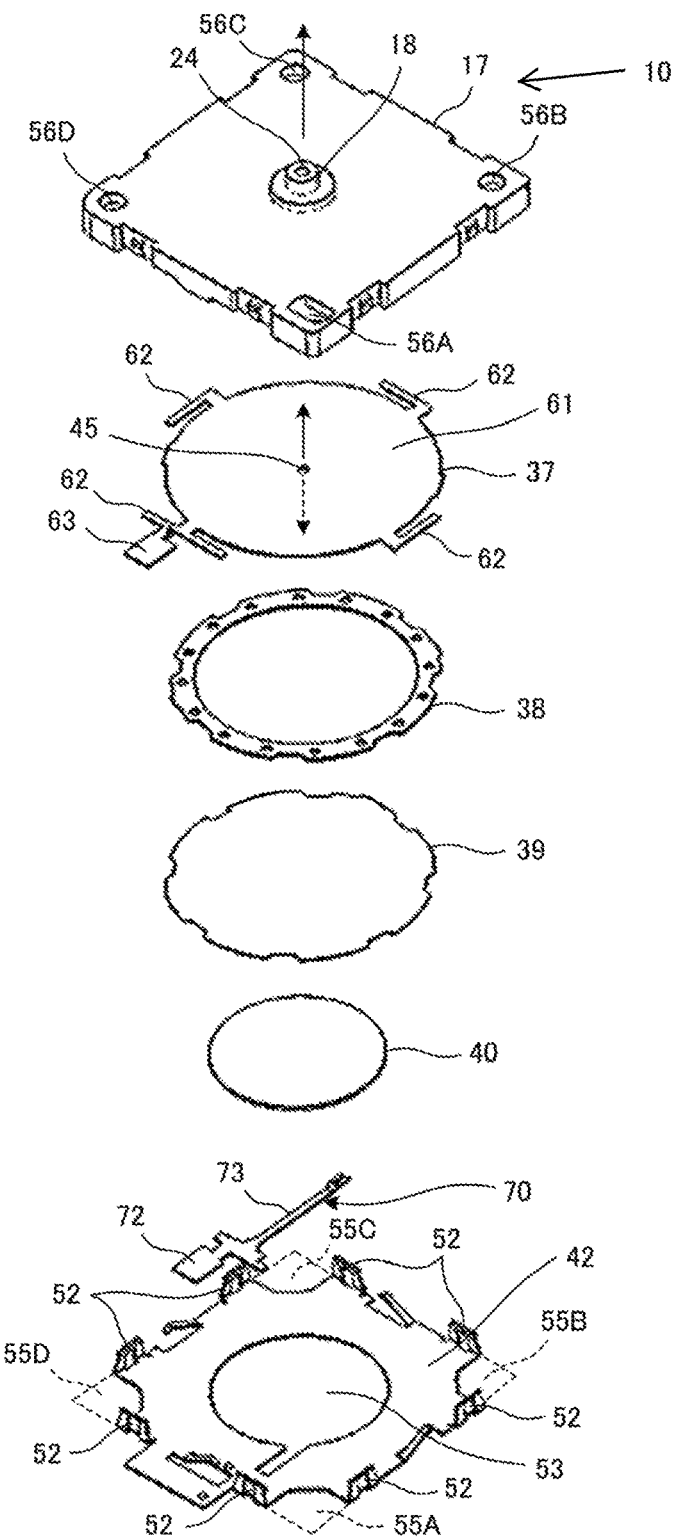
FIG. 3 is an exploded perspective view of the piezoelectric pump 10 illustrated in FIG. 2.
Figure 4:
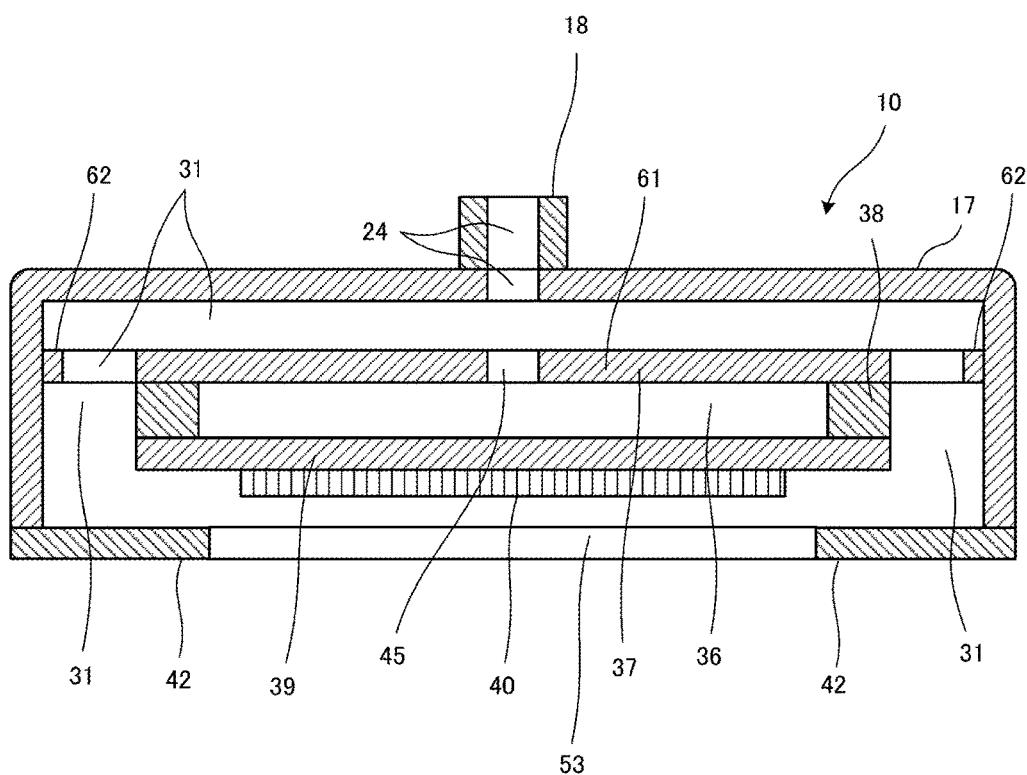
FIG. 4 is a sectional view of the piezoelectric pump 10 taken along line S-S of FIG. 2.

FIG. 2 is an external perspective view of the piezoelectric pump 10 illustrated in FIG. 1. FIG. 3 is an exploded perspective view of the piezoelectric pump 10 illustrated in FIG. 2. FIG. 4 is a sectional view of the piezoelectric pump 10 taken along line S-S of FIG. 2. As illustrated in FIG. 2 to FIG. 4, the piezoelectric pump 10 is not provided with a check valve and has a structure in which the suction hole 53 and the discharge hole 24 are in constant communication with each other.

The piezoelectric pump 10 includes an outer housing 17, a top plate 37, a side plate 38, a vibrating plate 39, a piezoelectric element 40, and a cap 42. The outer housing 17, the top plate 37, the side plate 38, the vibrating plate 39, the piezoelectric element 40, and the cap 42 are laminated together in this order in a top-bottom direction. The top plate 37, the side plate 38, and the vibrating plate 39 form a pump chamber 36. The piezoelectric pump 10 has dimensions (width×length×height) of 20 mm×20 mm×1.85 mm. Note that the height refers to the height of a portion of the piezoelectric pump 10 excluding a nozzle 18.

The outer housing 17 includes the nozzle 18, and the discharge hole 24 through which air is to be discharged is formed in the center of the nozzle 18. The nozzle 18 has dimensions (outer diameter×inner diameter (i.e., diameter of the discharge hole 24)×height) of 2.0 mm×0.8 mm×1.6 mm. Threaded holes 56A to 56D are formed at four corners of the outer housing 17.

The outer housing 17 is formed so as to have a U-shaped cross section while a lower portion thereof is open, and the top plate 37 of the pump chamber 36, the side plate 38 of the pump chamber 36, the vibrating plate 39, and the piezoelectric element 40 are accommodated in the outer housing 17. The outer housing 17 is made of, for example, a resin.

The top plate 37 of the pump chamber 36 has a circular plate-like shape and is made of, for example, a metal. The top plate 37 includes a center portion 61, hook-shaped projecting portions 62, and an external terminal 63 that is to be connected to an external circuit. Each of the hook-shaped projecting portions 62 projects from the center portion 61 in the horizontal direction and is in contact with an inner wall of the outer housing 17.

A ventilation hole 45 is formed in the center portion 61 of the top plate 37 and allows the communication between the inside and outside of the pump chamber 36. The ventilation hole 45 is formed at a position facing the discharge hole 24 of the outer housing 17. The top plate 37 is joined to a top surface of the side plate 38.

The side plate 38 of the pump chamber 36 has a ring-like shape and is made of, for example, a metal. The side plate 38 is joined to a top surface of the vibrating plate 39. Accordingly, the thickness of the side plate 38 corresponds to the height of the pump chamber 36.

The vibrating plate 39 has a circular plate-like shape and is made of, for example, a metal. The vibrating plate 39 forms a bottom surface of the pump chamber 36.

The piezoelectric element 40 has a circular plate-like shape and is made of, for example, a PZT-based ceramic. The piezoelectric element 40 is joined to a main surface of the vibrating plate 39, the main surface being located on the side opposite to the side on which the pump chamber 36 is present, and bends in response to an alternating-current (AC) voltage being applied to the piezoelectric element 40. The piezoelectric element 40 and the vibrating plate 39 form an actuator.

A unified body formed of the top plate 37, the side plate 38, the vibrating plate 39, and the piezoelectric element 40 is elastically supported by the four projecting portions 62 of the top plate 37 with respect to the outer housing 17.

An electrode-conduction plate 70 includes an internal terminal 73 that is to be connected to the piezoelectric element 40 and an external terminal 72 that is to be connected to the external circuit. An end of the internal terminal 73 is soldered to a flat-plate surface of the piezoelectric element 40. By setting the position at which the end of the internal terminal 73 is soldered to a position corresponding to a node of bending vibration of the piezoelectric element 40, the vibration of the internal terminal 73 can be further suppressed.

The suction hole 53 having a circular plate-like shape is formed in the cap 42. The diameter of the suction hole 53 is larger than the diameter of the piezoelectric element 40. In addition, in the cap 42, cutout portions 55A to 55D are formed at positions corresponding to the threaded holes 56A to 56D of the outer housing 17.

The cap 42 includes projecting portions 52 that are formed at the outer peripheral edge of the cap 42 and that project toward the top plate 37. The cap 42 clamps the outer housing 17 by using the projecting portions 52 and accommodates, together with the outer housing 17, the top plate 37 of the pump chamber 36, the side plate 38 of the pump chamber 36, the vibrating plate 39, and the piezoelectric element 40. The cap 42 is made of, for example, a resin.

As illustrated in FIG. 4, a ventilation path 31 is formed between the unified body, which is formed of the top plate 37, the side plate 38, the vibrating plate 39, and the piezoelectric element 40, and the outer housing 17 and the cap 42.

The structure of the valve 101 will now be described in detail with reference to FIG. 1, FIG. 5, and FIG. 6.

Figure 5:
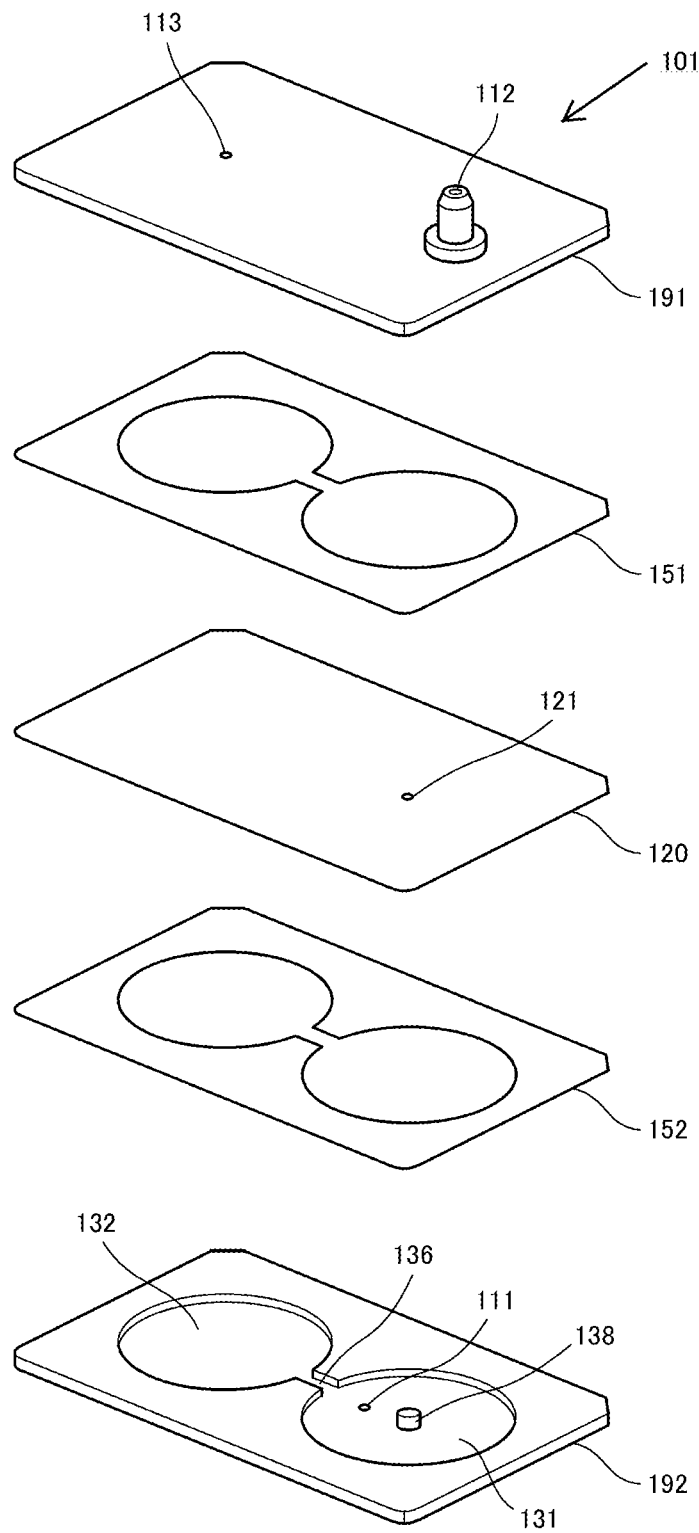
FIG. 5 is an exploded perspective view of a valve 101 illustrated in FIG. 1.
Figure 6:
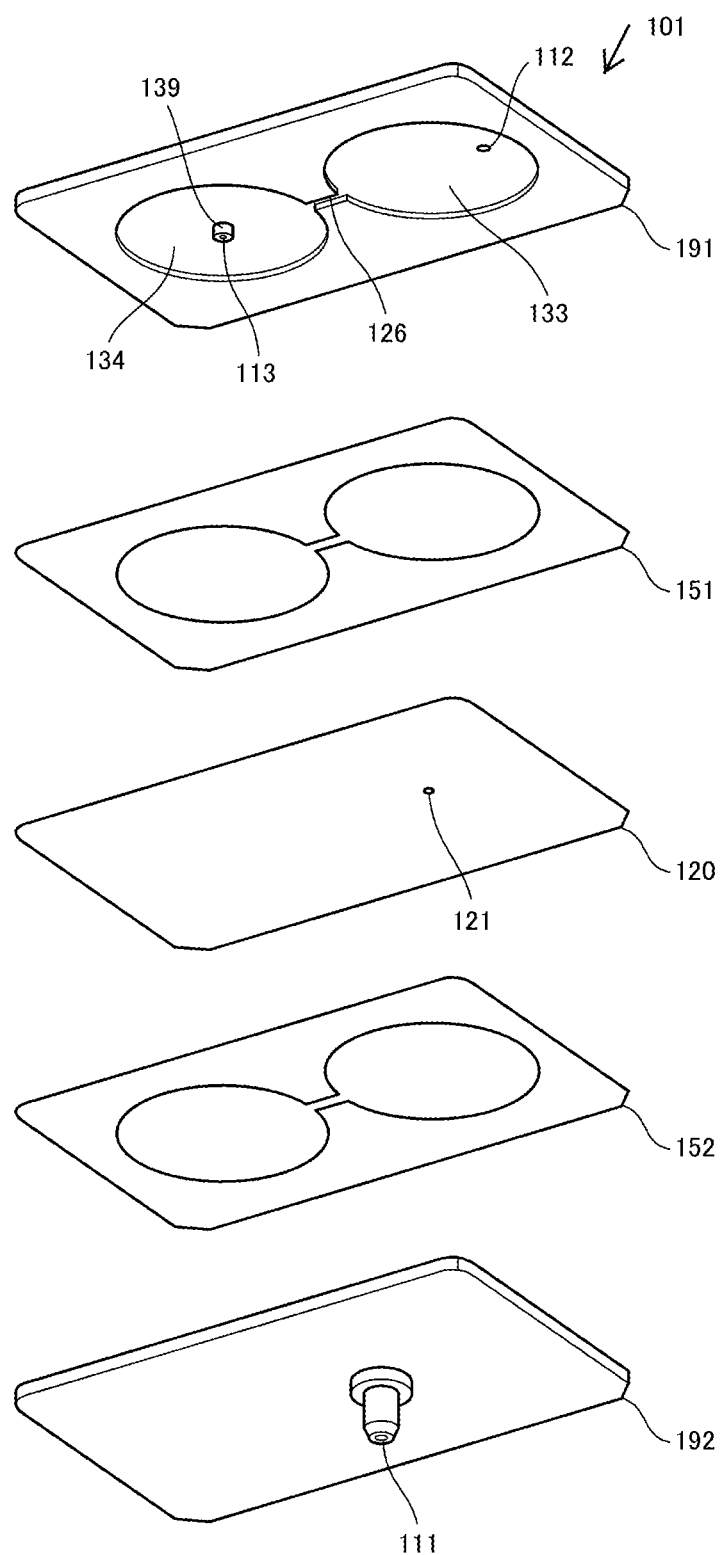
FIG. 6 is an exploded perspective view of the valve 101 illustrated in FIG. 1.

FIG. 5 and FIG. 6 are exploded perspective views of the valve 101 illustrated in FIG. 1. FIG. 5 is an exploded perspective view of the valve 101 when viewed from the top surface side of the valve 101, and FIG. 6 is an exploded perspective view of the valve 101 when viewed from the bottom surface side of the valve 101.

As illustrated in FIG. 1, FIG. 5, and FIG. 6, the valve 101 includes the lower valve housing 192, a second seal member 152, the diaphragm 120, a first seal member 151, and the upper valve housing 191 and has a structure whereby these members are stacked on top of one another in this order.

As illustrated in FIG. 1, FIG. 5, and FIG. 6, the upper valve housing 191 has the second ventilation hole 112, the third ventilation hole 113, a valve seat 139, and a communication path 126. The second ventilation hole 112 is in communication with the outside of the suction device 100. The third ventilation hole 113 is in communication with the outside of the suction device 100 via the cavity 83. The valve seat 139 projects from the periphery of the third ventilation hole 113 toward the diaphragm 120. The communication path 126 allows the communication between a first upper valve chamber 133 and a second upper valve chamber 134. The upper valve housing 191 is made of, for example, a resin. The valve seat 139 has a cylindrical shape, and the third ventilation hole 113 is formed in a center portion of the valve seat 139.

As illustrated in FIG. 1, FIG. 5, and FIG. 6, the lower valve housing 192 includes the first ventilation hole 111, a valve seat 138, and a communication path 136. The first ventilation hole 111 is in communication with the discharge hole 24 of the piezoelectric pump 10. The valve seat 138 has a columnar shape and projects toward the diaphragm 120. The communication path 136 allows the communication between the first lower valve chamber 131 and a second lower valve chamber 132. The lower valve housing 192 is made of, for example, a resin.

As illustrated in FIG. 1, FIG. 5, and FIG. 6, in the diaphragm 120, a fourth ventilation hole 121 having a circular shape is formed at the center of a region facing the valve seat 138. The diameter of the fourth ventilation hole 121 is set to be smaller than the diameter of a surface of the valve seat 138, which is brought into contact with the diaphragm 120.

The diaphragm 120 is formed of a thin film having a rectangular shape. The material of the diaphragm 120 is, for example, a rubber such as ethylene propylene diene monomer (EPDM) rubber or a silicone rubber.

The diaphragm 120 is clamped between the upper valve housing 191 and the lower valve housing 192 with the first seal member 151 interposed between the upper valve housing 191 and the diaphragm 120 and with the second seal member 152 interposed between the lower valve housing 192 and the diaphragm 120.

Each of the first seal member 151 and the second seal member 152 is formed of a thin film having a rectangular shape. For example, each of the first seal member 151 and the second seal member 152 is formed of a double-sided adhesive tape or is made of an adhesive. In the first seal member 151, an opening is formed in a region facing the first upper valve chamber 133, the communication path 126, and the second upper valve chamber 134. In the second seal member 152, an opening is formed in a region facing the first lower valve chamber 131, the communication path 136, and the second lower valve chamber 132.

As illustrated in FIG. 1, the diaphragm 120 is fixed to the upper valve housing 191 and the lower valve housing 192 such that a portion of the diaphragm 120 around the periphery of the fourth ventilation hole 121 is brought into contact with the valve seat 138 and that another portion of the diaphragm 120 is brought into contact with the valve seat 139.

The diaphragm 120 divides a region enclosed by the upper valve housing 191 and the lower valve housing 192 as a result of being fixed to the upper valve housing 191 and the lower valve housing 192.

Accordingly, in the region enclosed by the upper valve housing 191 and the lower valve housing 192, the diaphragm 120 forms the first lower valve chamber 131 having a ring-like shape, the second lower valve chamber 132 having a cylindrical shape, the first upper valve chamber 133 having a cylindrical shape, and the second upper valve chamber 134 having a ring-like shape.

Here, the first lower valve chamber 131 is in communication with the first ventilation hole 111. The first upper valve chamber 133 is in communication with the second ventilation hole 112. The second lower valve chamber 132 is in communication with the first lower valve chamber 131 via the communication path 136. The second upper valve chamber 134 is in communication with the first upper valve chamber 133 via the communication path 126.

Note that the first lower valve chamber 131, the communication path 136, and the second lower valve chamber 132 correspond to an example of a first region according to the present disclosure. The first upper valve chamber 133, the communication path 126, and the second upper valve chamber 134 correspond to an example of a second region according to the present disclosure. The valve seat 138 corresponds to an example of a first valve seat according to the present disclosure. The valve seat 139 corresponds to an example of a second valve seat according to the present disclosure.

The diaphragm 120 forms, together with the upper valve housing 191 and the lower valve housing 192, a check valve 160. The check valve 160 is formed of the first lower valve chamber 131, the first upper valve chamber 133, the valve seat 138, and a portion of the diaphragm 120, the portion facing the first lower valve chamber 131 and the first upper valve chamber 133.

In addition, the diaphragm 120 forms, together with the upper valve housing 191 and the lower valve housing 192, an exhaust valve 170. The exhaust valve 170 is formed of the second lower valve chamber 132, the second upper valve chamber 134, the valve seat 139, and a portion of the diaphragm 120, the portion facing the second lower valve chamber 132 and the second upper valve chamber 134.

In the check valve 160, a portion of the diaphragm 120 around the periphery of the fourth ventilation hole 121 moves into and out of contact with the valve seat 138 due to a pressure difference between the first lower valve chamber 131 and the first upper valve chamber 133. As a result, the check valve 160 enables the flow of the air from the first lower valve chamber 131 toward the first upper valve chamber 133 via the fourth ventilation hole 121 and interrupts the flow of the air from the first upper valve chamber 133 toward the first lower valve chamber 131.

In the exhaust valve 170, as illustrated in FIG. 1, when the area of the portion of the diaphragm 120 facing the second lower valve chamber 132 is denoted by S1, the pressure in the second lower valve chamber 132 is denoted by P1, the area of a portion of the diaphragm 120 facing the second upper valve chamber 134 is denoted by S2, the pressure in the second upper valve chamber 134 is denoted by P2, the area of a portion of the diaphragm 120 facing the third ventilation hole 113 is denoted by S3, and the pressure in the third ventilation hole 113 is denoted by P3, in the case where a relationship of S1×(P1−P2)>S3×(P3−P1) is satisfied, the diaphragm 120 moves into contact with the valve seat 139. Conversely, in the case where a relationship of S1×(P1−P2) ≤S3×(P3−P1) is satisfied, the diaphragm 120 moves out of contact with the valve seat 139. In other words, the diaphragm 120 moves into and out of contact with the valve seat 139 in accordance with the ON/OFF states of the piezoelectric pump 10.

Note that, as illustrated in FIG. 5 and FIG. 6, in the valve 101, the external shape of each of the valve chambers 131, 132, 133, and 134 is a circular shape, and thus, tension is applied uniformly to the diaphragm 120 (particularly the portion of the diaphragm 120 around the periphery of the fourth ventilation hole 121).

Therefore, a probability that the diaphragm 120 will be brought into contact with the valve seat 138 in a state where the fourth ventilation hole 121 of the diaphragm 120 is inclined with respect to the valve seat 138 and a probability that the fourth ventilation hole 121 of the diaphragm 120 will be displaced with respect to the valve seat 138 in the horizontal direction are reduced.

Operation of the piezoelectric pump 10 during the period when the piezoelectric pump 10 is driven will now be described.

Figure 7A:
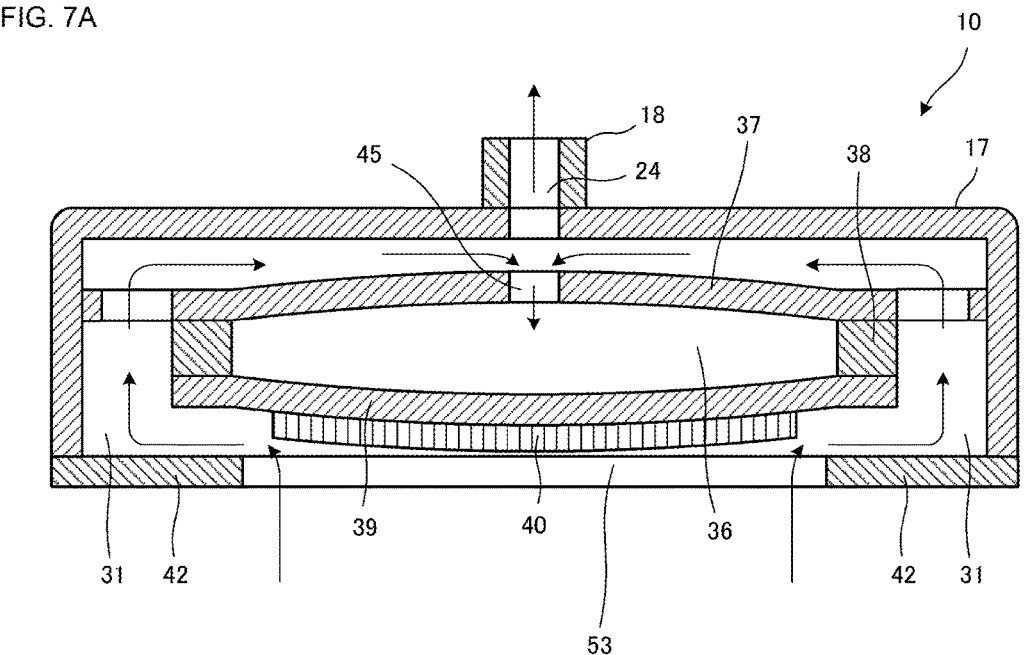
FIGS. 7A and 7B are sectional views of the piezoelectric pump 10 taken along line S-S of FIG. 2 when the piezoelectric pump 10 is caused to operate in a first mode.
Figure 7B:
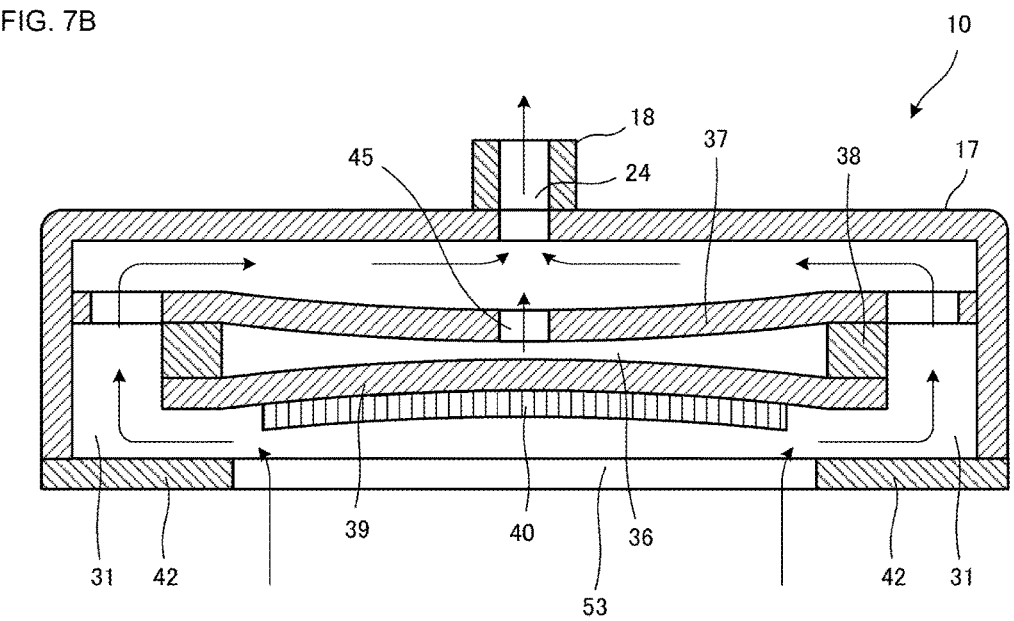

FIGS. 7A and 7B are sectional views of the piezoelectric pump 10 illustrated in FIG. 2 taken along line S-S when the piezoelectric pump 10 is caused to operate at the frequency of a first mode (fundamental wave). Here, arrows in FIGS. 7A and 7B indicate the flow of air.

In the state illustrated in FIG. 4, when an AC drive voltage at the frequency of the first mode (fundamental wave) is applied to the piezoelectric element 40 through the external terminals 63 and 72, the vibrating plate 39 performs concentric circular bending vibration. At the same time, pressure fluctuations in the pump chamber 36 along with the bending vibration of the vibrating plate 39 causes the top plate 37 to perform concentric circular bending vibration along with the bending vibration of the vibrating plate 39 (with a vibration phase delay of 180 degrees in the present embodiment).

As a result, as illustrated in FIGS. 7A and 7B, the vibrating plate 39 and the top plate 37 are bent and deformed, so that the volume of the pump chamber 36 periodically changes.

As illustrated in FIG. 7A, when an AC voltage is applied to the piezoelectric element 40 so as to cause the vibrating plate 39 to bend toward the piezoelectric element 40, the capacity of the pump chamber 36 is increased. Along with this, the air outside the piezoelectric pump 10 is drawn into the pump chamber 36 via the suction hole 53, the ventilation path 31, and the ventilation hole 45. While the air is not flowing out from the pump chamber 36, an inertial force of the flow of the air from the discharge hole 24 toward the outside of the piezoelectric pump 10 is generated.

As illustrated in FIG. 7B, when an AC voltage is applied to the piezoelectric element 40 so as to cause the vibrating plate 39 to bend toward the pump chamber 36, the capacity of the pump chamber 36 is decreased. Along with this, the air in the pump chamber 36 is discharged from the discharge hole 24 via the ventilation hole 45 and the ventilation path 31.

In this case, the air that is discharged from the pump chamber 36 is discharged through the discharge hole 24 while the air outside the piezoelectric pump 10 is drawn in via the suction hole 53 and the ventilation path 31. Thus, in the piezoelectric pump 10, the flow rate of the air that is discharged through the discharge hole 24 is increased by the flow rate of the air that is drawn in.

The flow of the air in the suction device 100 will now be described.

Figure 8:
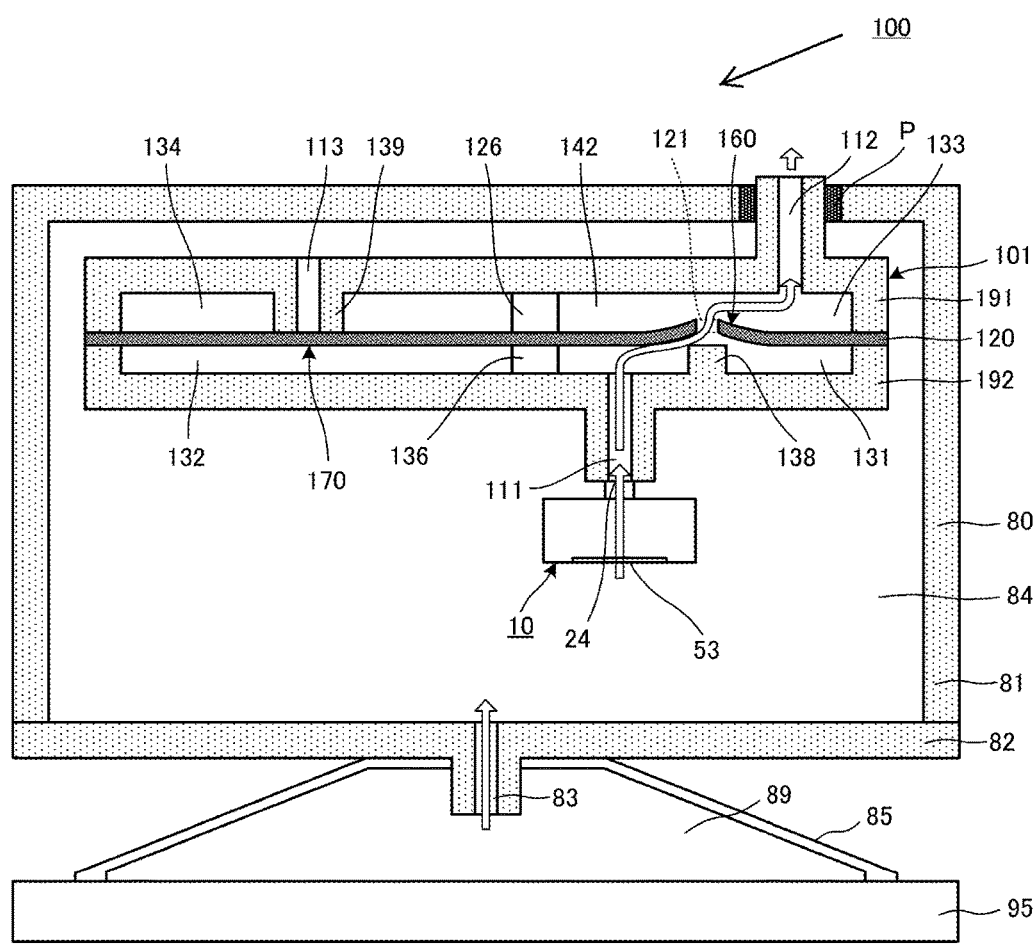
FIG. 8 is a diagram illustrating the flow of air in the suction device 100 during the period when the piezoelectric pump 10 is driven.

FIG. 8 is a diagram illustrating the flow of air in the suction device 100 during the period when the piezoelectric pump 10 is driven. Arrows in FIG. 8 indicate the flow of the air.

Note that, as described above, the first lower valve chamber 131, the communication path 136, and the second lower valve chamber 132 correspond to an example of the first region according to the present disclosure. The first upper valve chamber 133, the communication path 126, and the second upper valve chamber 134 correspond to an example of the second region according to the present disclosure. The valve seat 138 corresponds to an example of the first valve seat according to the present disclosure. The valve seat 139 corresponds to an example of the second valve seat according to the present disclosure.

First, a user brings the suction pad 85 of the suction device 100 into contact with the object 95. Then, the user brings the piezoelectric pump 10 into the ON state.

Once the piezoelectric pump 10 has been driven, the air in an enclosed space 89 between the suction pad 85 and the object 95 and the air in the enclosed space 84 are drawn into the piezoelectric pump 10 via the suction hole 53. Then, the air in the piezoelectric pump 10 is discharged from the discharge hole 24 to the first ventilation hole 111 of the valve 101.

As a result, in the check valve 160, the pressure in the first lower valve chamber 131 becomes higher than the pressure in the first upper valve chamber 133. Thus, in the check valve 160, the portion of the diaphragm 120 around the periphery of the fourth ventilation hole 121 moves out of contact with the valve seat 138, and the first ventilation hole 111 and the second ventilation hole 112 are caused to communicate with each other via the fourth ventilation hole 121.

In contrast, in the exhaust valve 170, the pressure in the second lower valve chamber 132 is higher than the pressure in the second upper valve chamber 134. Thus, the diaphragm 120 seals the third ventilation hole 113 and interrupts the communication between the second ventilation hole 112 and the third ventilation hole 113.

In other words, in the valve 101, in the case where the pressure in the first region is higher than the pressure in the second region, the first ventilation hole 111 and the second ventilation hole 112 are caused to communicate with each other, and the communication between the second ventilation hole 112 and the third ventilation hole 113 is interrupted.

Therefore, during the period when the piezoelectric pump 10 is in the ON state, the air in the enclosed space 84 is drawn in through the suction hole 53 of the piezoelectric pump 10 and flows from the first ventilation hole 111 to the first upper valve chamber 133 via the first lower valve chamber 131. Then, the air is discharged from the suction device 100 to the outside through the second ventilation hole 112.

As a result, during the period when the piezoelectric pump 10 is in the ON state, the pressure in the enclosed space 84 becomes a negative pressure. Consequently, the suction device 100 can suck in the object 95 by using the suction pad 85 by the negative pressure generated in the enclosed space 89. A user can move the object 95 sucked to the suction pad 85.

Figure 9:
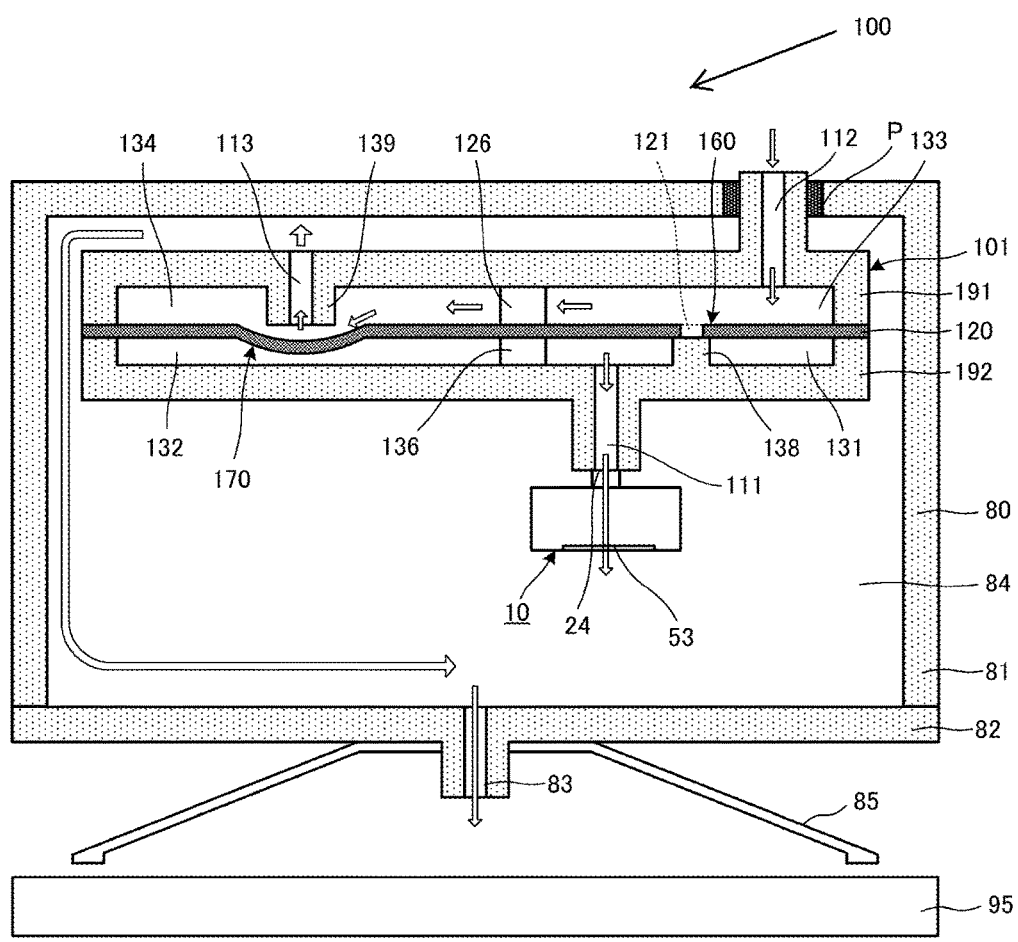
FIG. 9 is a diagram illustrating the flow of the air in the suction device 100 immediately after driving of the piezoelectric pump 10 has been discontinued.

FIG. 9 is a diagram illustrating the flow of the air in the suction device 100 immediately after driving of the piezoelectric pump 10 has been discontinued. Arrows in FIG. 9 indicate the flow of the air.

When separating the object 95 from the cavity 83, a user brings the piezoelectric pump 10 into the OFF state. As a result, driving of the piezoelectric pump 10 is discontinued.

Here, immediately after the piezoelectric pump 10 has been brought into the OFF state, the pressure in the first region is higher than the pressure in the enclosed space 84. In addition, as illustrated in FIG. 2 to FIG. 4, the piezoelectric pump 10 has a structure in which the suction hole 53 and the discharge hole 24 are in constant communication with each other.

Accordingly, immediately after the piezoelectric pump 10 has been brought into the OFF state, as illustrated in FIG. 9, a small portion of the air flows backward from the discharge hole 24 toward the suction hole 53. Thus, the pressure in the first region becomes lower than the pressure in the second region.

As a result, in the check valve 160, the pressure in the first lower valve chamber 131 becomes lower than the pressure in the first upper valve chamber 133. Consequently, the diaphragm 120 moves into contact with the valve seat 138 and closes the fourth ventilation hole 121.

In contrast, in the exhaust valve 170, the pressure in the second lower valve chamber 132 is lower than the pressure in the second upper valve chamber 134. Thus, when a relationship of $S1 \times (P1-P2) < S3 \times (P3-P1)$ is satisfied, the diaphragm 120 moves out of contact with the valve seat 139 and opens the third ventilation hole 113.

In other words, in the valve 101, in the case where the pressure in the first region is lower than the pressure in the second region, the second ventilation hole 112 and the third ventilation hole 113 are caused to communicate with each other. As a result, the air rapidly flows through the second ventilation hole 112 into the enclosed space 84 via the first upper valve chamber 133, the communication path 126, the second upper valve chamber 134, and the third ventilation hole 113 (see FIG. 9).

This causes an increase in the pressure (air pressure) in the enclosed space 84 and restores the pressure in the enclosed space 84 to atmospheric pressure. Therefore, the suction device 100 can separate the object 95 from the suction pad 85.

In the manner described above, the diaphragm 120 automatically switches the flow path by using the pressure at the first ventilation hole 111 and the pressure at the second ventilation hole 112. In other words, the valve 101, which has the above-described configuration, passively opens and closes the valve in accordance with the operation of the piezoelectric pump 10. Thus, the suction device 100, which has the above-described configuration, can cause the object 95 to be sucked thereto and separated therefrom without including a solenoid valve.

Therefore, the suction device 100, which has the above-described configuration, can be further reduced in weight and size than that of the related art, and the noise generated by the suction device 100 can be further reduced than that of the related art.

The piezoelectric pump 10 uses the piezoelectric element 40 as a driving source, and sound and vibration generated during the period when the piezoelectric element 40 is driven are small. Thus, the noise generated by the suction device 100 can be further reduced.

A suction device 200 according to a second embodiment of the present disclosure will be described below.

Figure 10:
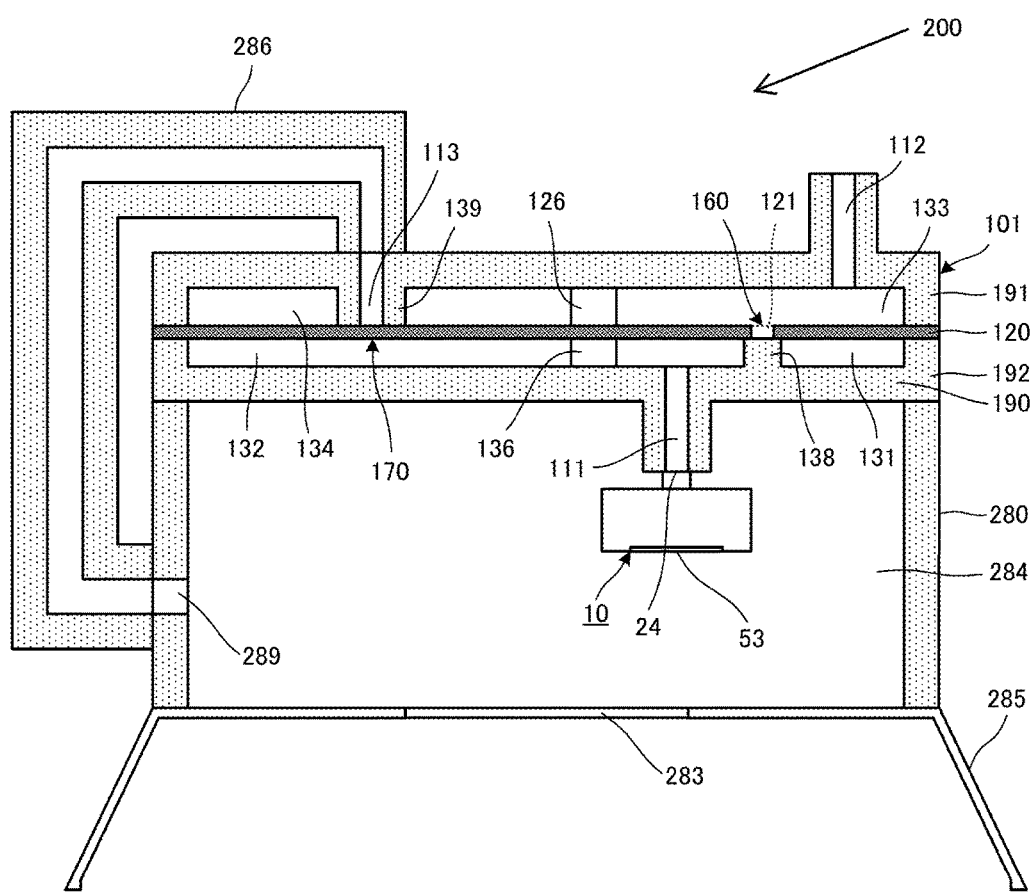
FIG. 10 is a diagram illustrating the appearance of a suction device 200 according to a second embodiment of the present disclosure.

FIG. 10 is a diagram illustrating the appearance of the suction device 200 according to the second embodiment of the present disclosure. The differences between the suction device 200 and the above-described suction device 100 are the shape of a housing 280 and the shape of a suction pad 285. The rest of the configuration of the suction device 200 is the same as that of the suction device 100, and thus, description thereof will be omitted.

The difference between the housing 280 and the above-described housing 80 is that an enclosed space 284 is in communication with the third ventilation hole 113 via a tube 286. The rest of the configuration of the housing 280 is the same as that of the housing 80. The housing 280 has a cavity 283 and a hole 289. The housing 280 forms the enclosed space 284 together with the piezoelectric pump 10 and the valve 101. The enclosed space 284 is a space that is in communication with the hole 289, the cavity 283, the suction hole 53, and the third ventilation hole 113.

The suction pad 285 is attached to the cavity 283 of the housing 280. The only difference between the suction pad 285 and the above-described suction pad 85 is the shape of the suction pad 285. The rest of the configuration of the suction pad 285 is the same as that of the suction pad 85.

The flow of the air in the suction device 200 is substantially the same as the flow of the air in the suction device 100 illustrated in FIG. 8 and FIG. 9. In the suction device 200, immediately after driving of the piezoelectric pump 10 has been discontinued, the air rapidly flows through the second ventilation hole 112 into the enclosed space 284 via the first upper valve chamber 133, the communication path 126, the second upper valve chamber 134, the third ventilation hole 113, and the inside of the tube 286.

Thus, the suction device 200 can obtain advantageous effects similar to those of the suction device 100. Since the enclosed space 284 and the third ventilation hole 113 communicate with each other via the tube 286, the components of the suction device 200 are easier to assemble than the components of the suction device 100. Therefore, the manufacturing costs of the suction device 200 can be lower than the manufacturing costs of the suction device 100.

A suction device 300 according to a third embodiment of the present disclosure will be described below.

Figure 11:
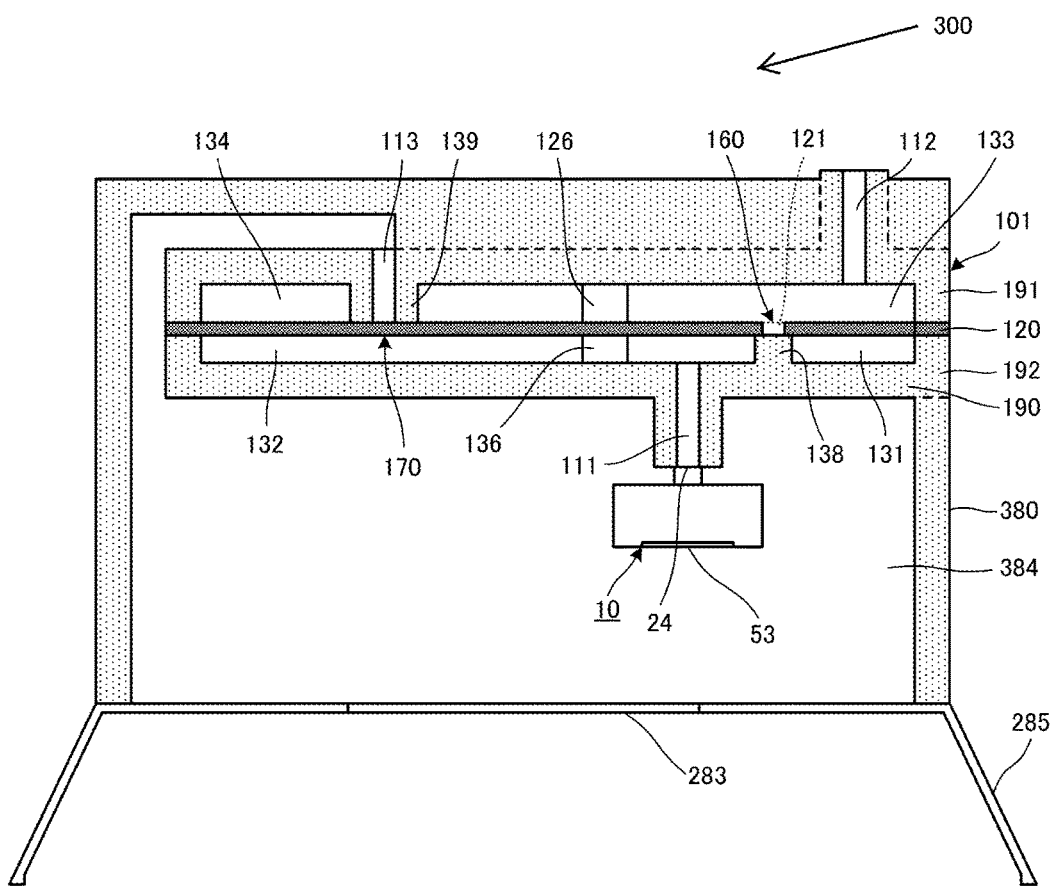
FIG. 11 is a cross-sectional view of a suction device 300 according to a third embodiment of the present disclosure.

FIG. 11 is a cross-sectional view of the suction device 300 according to the third embodiment of the present disclosure. The difference between the suction device 300 and the above-described suction device 100 is that the valve casing 190 of the valve 101 and a housing 380 are integrally formed. The rest of the configuration of the suction device 300 is the same as that of the suction device 100, and thus, description thereof will be omitted. The housing 380 forms an enclosed space 384 together with the piezoelectric pump 10 and the valve 101. The enclosed space 384 is a space that is in communication with the cavity 283, the suction hole 53, and the third ventilation hole 113.

The flow of the air in the suction device 300 is substantially the same as the flow of the air in the suction device 100 illustrated in FIG. 8 and FIG. 9.

Thus, the suction device 300 can obtain advantageous effects similar to those of the suction device 100. In addition, since the valve casing 190 and a housing 380 are integrally formed, the number of components of the suction device 300 can be smaller than the number of components of the suction device 100. Therefore, the manufacturing costs of the suction device 300 can be lower than the manufacturing costs of the suction device 100.

Other Embodiments

Note that, although air is used as a gas in the above-described embodiments, the present disclosure is not limited to air, and gases other than air may be used as the gas.

Although the piezoelectric pump 10 in each of the above-described embodiments includes a unimorph-type actuator that performs bending vibration, the piezoelectric pump 10 may include a bimorph-type actuator that is formed by attaching the piezoelectric element 40 to each of the two surfaces of the vibrating plate 39 and that performs bending vibration.

Although the piezoelectric pump 10 in each of the above-described embodiments includes an actuator that performs bending vibration by expansion and contraction of the piezoelectric element 40, the piezoelectric pump 10 is not limited to having this configuration. For example, the piezoelectric pump 10 may include an actuator that performs bending vibration as a result of being electromagnetically driven.

Although the piezoelectric element 40 is made of a PZT-based ceramic in each of the above-described embodiments, the material of the piezoelectric element 40 is not limited to this. For example, the piezoelectric element 40 may be made of a piezoelectric material of a non-lead-based piezoelectric ceramic, such as a potassium-sodium niobate-based ceramic or an alkali niobate-based ceramic, or the like.

In the above-described embodiments, although the suction device 100 is used as a pick-and-place device, the present disclosure is not limited to this. For example, the suction device 100 may be used in a breast pump, a pair of vacuum tweezers, a component mounting apparatus, a jig that temporarily sucks in and fixes in place a workpiece, a climbing robot, or a hand portion of a suction robot.

In the above-described embodiments, although the suction pad 85 is attached to the cavity 83 of the housing 80, the present disclosure is not limited to this configuration. For example, the suction device 100 does not need to include the suction pad 85 attached to the cavity 83 and may directly suck in the object 95 through the cavity 83.

Lastly, the descriptions of the above-described embodiments are examples in all respects, and the present disclosure is not to be considered limited to the embodiments. The scope of the present disclosure is to be determined not by the above-described embodiments, but by the claims. In addition, the scope of the present disclosure includes a range equivalent to the claims.

P packing member
10 piezoelectric pump
17 outer housing
18 nozzle
24 discharge hole
31 ventilation path
36 pump chamber
37 top plate
38 side plate
39 vibrating plate
40 piezoelectric element
42 cap
45 ventilation hole
52 projecting portion
53 suction hole
55A cutout portion
56A threaded hole
61 center portion
62 projecting portion
63, 72 external terminal
70 electrode-conduction plate
73 internal terminal
80, 280, 380 housing
81 upper housing
82 lower housing
83 cavity
84, 89, 284, 384 enclosed space
85, 285 suction pad
95 object
100, 200, 300 suction device
101 valve
111 first ventilation hole
112 second ventilation hole
113 third ventilation hole
120 diaphragm
121 fourth ventilation hole
126 communication path
131 first lower valve chamber
132 second lower valve chamber
133 first upper valve chamber
134 second upper valve chamber
136 communication path
138, 139 valve seat
151 first seal member
152 second seal member
160 check valve
170 exhaust valve
190 valve casing
191 upper valve housing
192 lower valve housing
283 cavity
286 tube
289 hole

The invention claimed is:

1. A suction device comprising:
a valve including a valve casing and a diaphragm, wherein a first ventilation hole, a second ventilation hole and a third ventilation hole are provided in the valve casing, and the diaphragm is fixed to the valve casing so as to provide a flow path in the valve casing;
a pump having a suction hole and a discharge hole, wherein the discharge hole is in communication with the first ventilation hole; and
a housing having a cavity and providing an enclosed space together with the valve and the pump, wherein the enclosed space is in communication with the cavity, the suction hole and the third ventilation hole,
wherein the diaphragm switches, based on a pressure at the first ventilation hole and a pressure at the second ventilation hole, the flow path between a first form and a second form, wherein in the first form, the first ventilation hole and the second ventilation hole communicate with each other while the second ventilation hole and the third ventilation hole do not communicate with each other, and wherein in the second form, the first ventilation hole and the second ventilation hole do not communicate with each other while the second ventilation hole and the third ventilation hole communicate with each other.

2. The suction device according to claim 1,
wherein the diaphragm divides an inside of the valve casing into a first region being in communication with the first ventilation hole and a second region being in communication with the second ventilation hole, and
wherein the diaphragm switches the flow path to the first form when a pressure in the first region is higher than a pressure in the second region, and switches the flow path to the second form when the pressure in the first region is lower than the pressure in the second region.

3. The suction device according to claim 2,
wherein the valve casing includes a first valve seat projecting toward the diaphragm in the first region and a second valve seat projecting from a periphery of the third ventilation hole toward the diaphragm in the second region,
wherein the diaphragm has a fourth ventilation hole, and
wherein the diaphragm is fixed to the valve casing in a state where a portion of the diaphragm around a periphery of the fourth ventilation hole is in contact with the first valve seat and where another portion of the diaphragm is in contact with the second valve seat.

4. The suction device according to claim 3, further comprising a suction pad attached to the cavity.

5. The suction device according to claim 3,
wherein the pump has a structure in which the suction hole and the discharge hole are in constant communication with each other.

6. The suction device according to claim 3,
wherein the pump includes a piezoelectric body and performs a pumping operation by expansion and contraction of the piezoelectric body.

7. The suction device according to claim 2, further comprising a suction pad attached to the cavity.

8. The suction device according to claim 2,
wherein the pump has a structure in which the suction hole and the discharge hole are in constant communication with each other.

9. The suction device according to claim 2,
wherein the pump includes a piezoelectric body and performs a pumping operation by expansion and contraction of the piezoelectric body.

10. The suction device according to claim 1, further comprising a suction pad attached to the cavity.

11. The suction device according to claim 10,
wherein the pump has a structure in which the suction hole and the discharge hole are in constant communication with each other.

12. The suction device according to claim 10,
wherein the pump includes a piezoelectric body and performs a pumping operation by expansion and contraction of the piezoelectric body.

13. The suction device according to claim 1,
wherein the pump has a structure in which the suction hole and the discharge hole are in constant communication with each other.

14. The suction device according to claim 13,
wherein the pump includes a piezoelectric body and performs a pumping operation by expansion and contraction of the piezoelectric body.

15. The suction device according to claim 1,
wherein the pump includes a piezoelectric body and performs a pumping operation by expansion and contraction of the piezoelectric body.

* * * * *